United States Patent
Friedrich

(10) Patent No.: US 12,066,614 B2
(45) Date of Patent: Aug. 20, 2024

(54) METHOD AND DEVICE FOR SCANNING A SAMPLE

(71) Applicant: LEICA MICROSYSTEMS CMS GMBH, Wetzlar (DE)

(72) Inventor: Lars Friedrich, Weinheim (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 756 days.

(21) Appl. No.: 17/278,691

(22) PCT Filed: Sep. 19, 2019

(86) PCT No.: PCT/EP2019/075104
§ 371 (c)(1),
(2) Date: Mar. 23, 2021

(87) PCT Pub. No.: WO2020/064481
PCT Pub. Date: Apr. 2, 2020

(65) Prior Publication Data
US 2022/0043245 A1    Feb. 10, 2022

(30) Foreign Application Priority Data
Sep. 24, 2018   (DE) .................. 10 2018 123 381.7

(51) Int. Cl.
G02B 21/00    (2006.01)

(52) U.S. Cl.
CPC ..... *G02B 21/0036* (2013.01); *G02B 21/0032* (2013.01); *G02B 21/0064* (2013.01)

(58) Field of Classification Search
CPC ............ G02B 21/0036; G02B 21/0064; G02B 21/0076; G02B 21/0032; G02B 21/002;
(Continued)

(56) References Cited

U.S. PATENT DOCUMENTS 5,304,810 A       4/1994  Amos
6,529,271 B1 *    3/2003  Engelhardt ............... G06T 7/00
                                                           356/417
(Continued)

FOREIGN PATENT DOCUMENTS

DE    102012019121 A1    4/2013
DE    102014119027 A1    6/2016
(Continued)

OTHER PUBLICATIONS

Bingen, Pit et al. "Parallelized STED fluorescence nanoscopy," Opt Express, 2011, 19, pp. 23716-23726, Optical Society of America, USA, Nov. 7, 2011.
(Continued)

*Primary Examiner* — Stephone B Allen
*Assistant Examiner* — Jyotsna V Dabbi
(74) *Attorney, Agent, or Firm* — LEYDIG, VOIT & MAYER, LTD.

(57) ABSTRACT

A method for scanning a sample in microscopy includes generating at least three illumination spots in order to form a spot pattern that contains at least two illumination spots having a first wavelength and an illumination spot having a second wavelength that differs from the first wavelength. At least one specified region of the sample is scanned by moving the spot pattern formed by the illumination spots along a first direction for generating scan lines, which are each associated with the illumination spots of the spot pattern, and by moving the spot pattern formed by the illumination spots along a second direction for generating scan lines respectively after the scan lines.

18 Claims, 15 Drawing Sheets

(58) Field of Classification Search
CPC .. G02B 21/0024; G02B 21/06; G02B 21/361; G01N 21/6458; G01N 21/6463
USPC .......................................................... 359/368
See application file for complete search history.

(56) References Cited

U.S. PATENT DOCUMENTS

| | | | |
|---|---|---|---|
| 7,684,048 B2* | 3/2010 | Meshulach | G01N 21/21 356/495 |
| 8,982,206 B2* | 3/2015 | Raicu | G01N 15/1433 348/79 |
| 2008/0156999 A1 | 7/2008 | Nishiwaki et al. | |
| 2009/0109527 A1 | 4/2009 | Sasaki et al. | |
| 2010/0277580 A1* | 11/2010 | Stallinga | G02B 27/0087 359/385 |
| 2014/0232848 A1* | 8/2014 | Schwedt | G02B 21/008 348/80 |
| 2016/0054226 A1 | 2/2016 | Gandolfi et al. | |
| 2016/0299326 A1 | 10/2016 | Eggert et al. | |
| 2017/0227748 A1 | 8/2017 | Anhut et al. | |
| 2017/0343477 A1* | 11/2017 | Santori | G01J 3/18 |
| 2019/0258041 A1 | 8/2019 | Anhut et al. | |

FOREIGN PATENT DOCUMENTS

| | | |
|---|---|---|
| DE | 102016119730 A1 | 4/2018 |
| EP | 3217205 A1 | 9/2017 |
| JP | 2008164841 A | 7/2008 |

OTHER PUBLICATIONS

Bewersdorf, Jörg et al. "Multifocal multiphoton microscopy," Opt Lett, 1998, 23, pp. 655-657, Optical Society of America, USA, May 1, 1998.

Poland, Simon P.; et al. "A high speed multifocal multiphoton fluorescence lifetime imaging microscope for live-cell FRET imaging," Biomed Opt Express, vol. 6, No. 2, Feb. 1, 2015, Optical Society of America, USA, pp. 277-296.

* cited by examiner

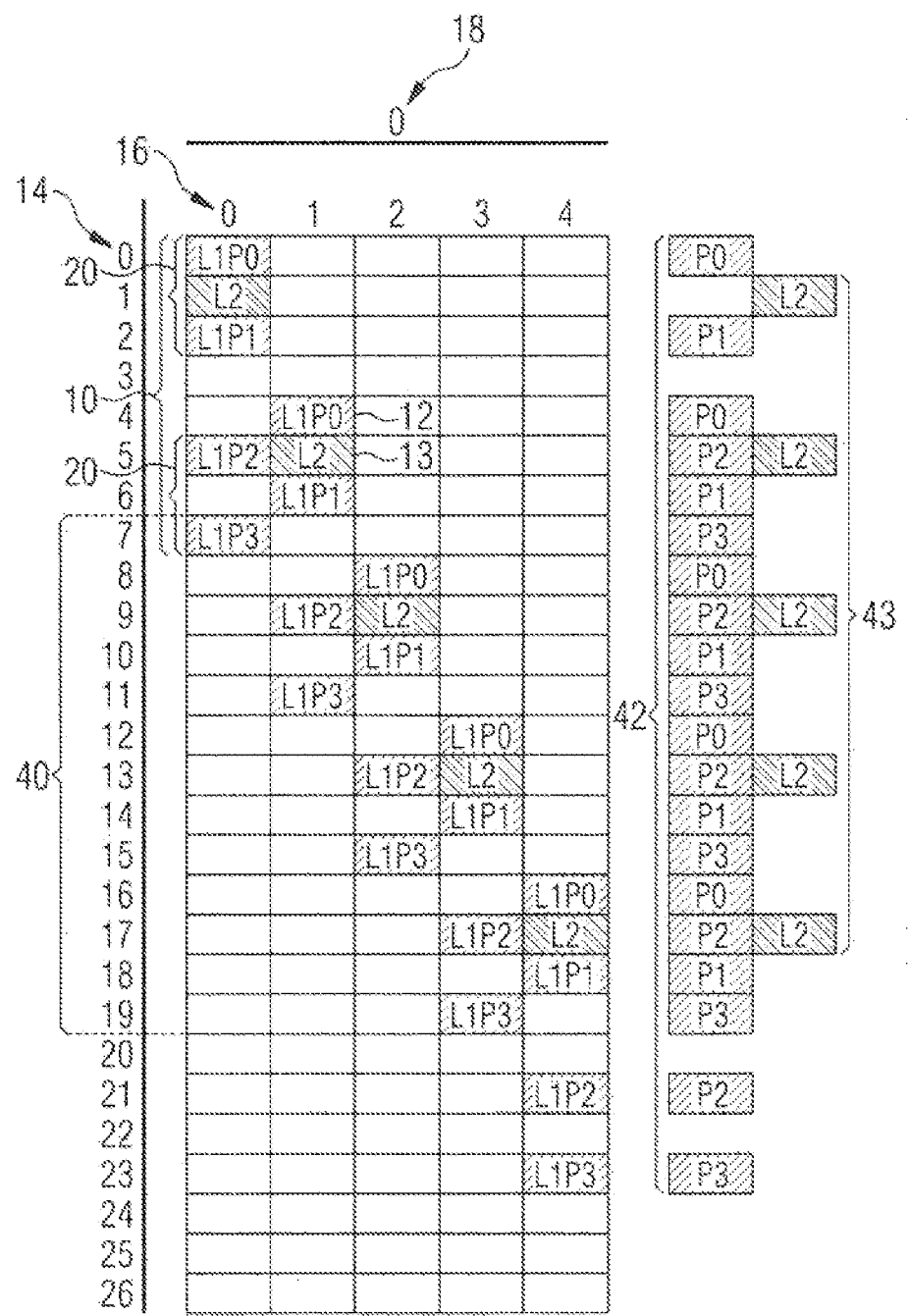

FIG. 4A

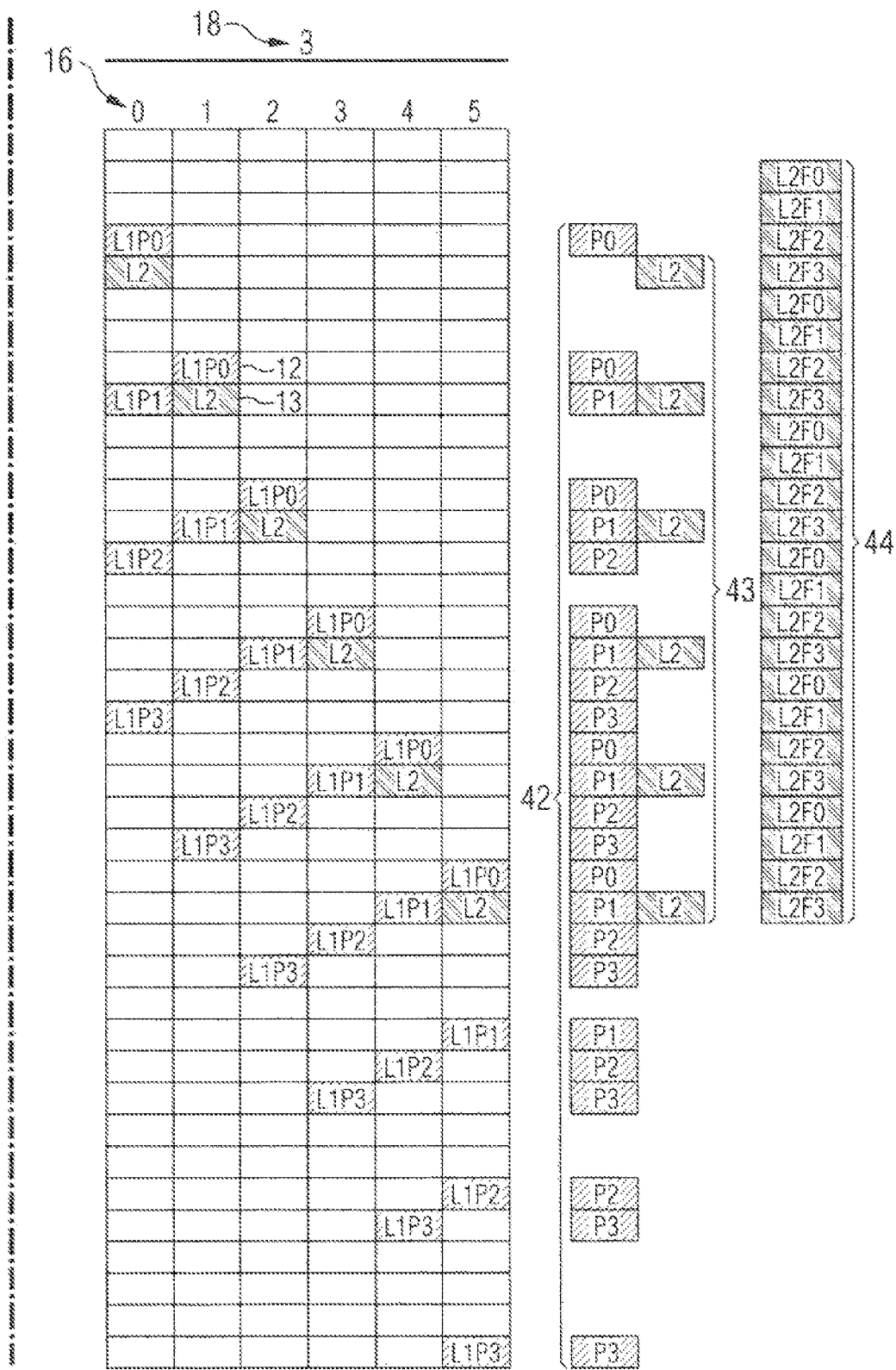

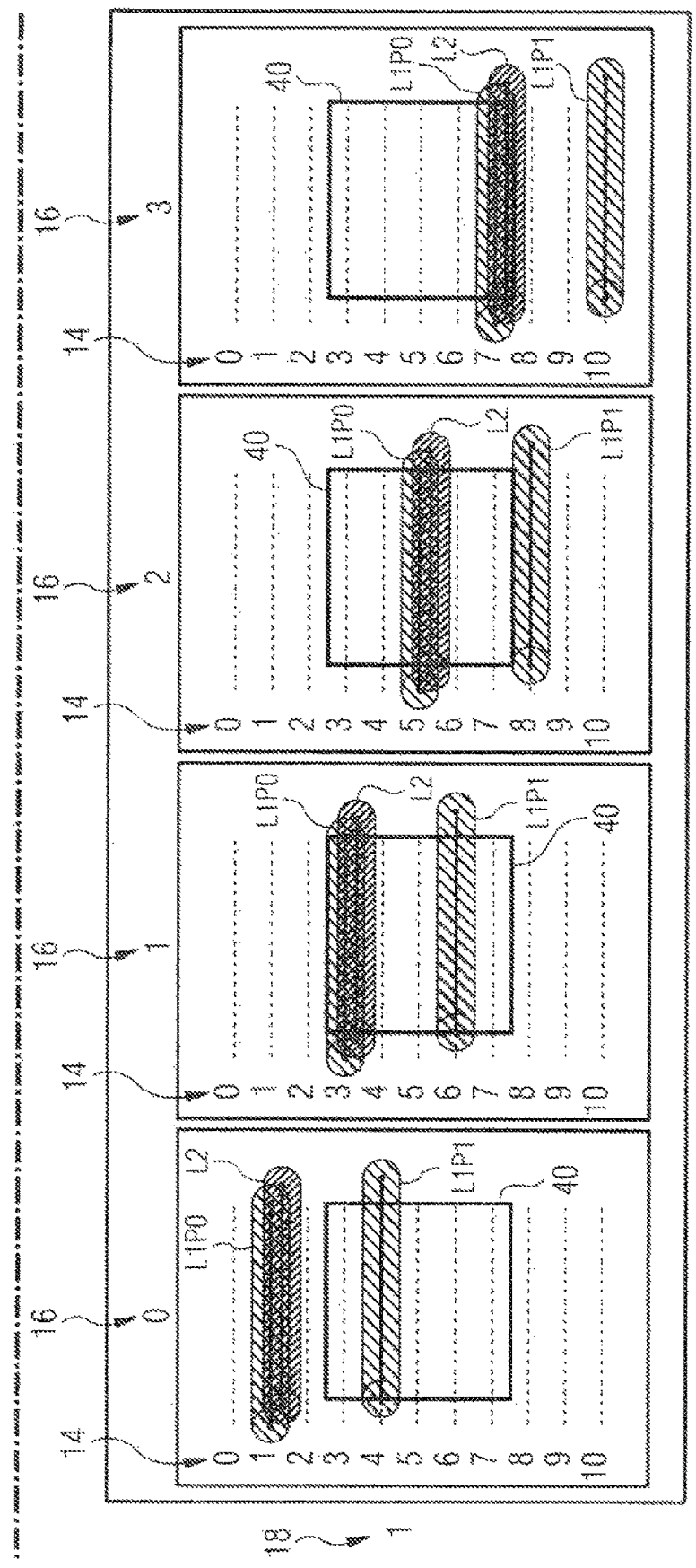

METHOD AND DEVICE FOR SCANNING A SAMPLE

CROSS-REFERENCE TO PRIOR APPLICATIONS

This application is a U.S. National Phase Application under 35 U.S.C. § 371 of International Application No. PCT/EP2019/075104, filed on Sep. 19, 2019, and claims benefit to German Patent Application No. DE 10 2018 123 381.7, filed on Sep. 24, 2018. The International Application was published in German on Apr. 2, 2020 as WO 2020/064481 A1 under PCT Article 21(2).

FIELD

The invention relates to a method for scanning a sample in microscopy, in which at least three illumination spots are generated. The invention further relates to a device for scanning a sample in microscopy, comprising an illumination unit which generates at least three illumination spots to form an illumination pattern.

BACKGROUND

Known microscopy methods for scanning a sample utilize spot patterns made of a plurality of illumination spots. By using a plurality of illumination spots, it is possible to scan a plurality of spots, which are associated with the illumination spots, on or in the sample. As it were, the scanning procedure is parallelized and hence the speed with which the sample is scanned is increased.

Known methods for scanning a sample further utilize illumination spots having different wavelengths in order to excite different dyes situated in the sample to fluoresce, said dyes having been used, for example, to mark different portions of the sample. As a result, it is possible to observe the relative position and the movement of the different portions of the sample relative to one another.

Bingen, P.; Reuss, M.; Engelhardt, J. & Hell, S. W., Parallelized STED fluorescence nanoscopy, Opt Express, 2011, 19, 23716-23726 has disclosed a method in which a plurality of illumination light spots are generated with the aid of Wollaston prisms, said illumination light spots each being formed from the light having different wavelengths.

Bewersdorf, J.; Pick, R. & Hell, S. W., Multifocal multiphoton microscopy, Opt Lett, 1998, 23, 655-657 has disclosed a microscope in which a plurality of illumination light spots are generated with the aid of an arrangement of microlenses. The illumination light spots are imaged into a sample and fluorescence light emitted by the sample is captured by a camera.

US 2009109527 A1 has disclosed a microscope in which an acoustic-optic deflector (AOD) is used to generate illumination spots which are arranged along a straight line and which are imaged into a sample. The fluorescence light emitted by the sample is detected by an arrangement of spot detectors, with a spot detector being assigned to each illumination spot.

Poland, S. P.; Krstajic, N.; Monypenny, J.; Coelho, S.; Tyndall, D.; Walker, R. J.; Devauges, V.; Richardson, J.; Dutton, N.; Barber, P.; Li, D. D.-U.; Suhling, K.; Ng, T.; Henderson, R. K. & Ameer-Beg, S. M., A high speed multifocal multiphoton fluorescence lifetime imaging microscope for live-cell FRET imaging, Biomed Opt Express, 2015 has disclosed a microscope in which a plurality of illumination spots are generated with the aid of a spatial light modulator (SLM), said illumination spots being arranged in a two-dimensional grid and being imaged into a sample. The fluorescence light emitted by the sample is detected by an arrangement of spot detectors, with a spot detector being assigned to each illumination spot.

EP 3217205 A1 has disclosed a device for multi-spot scanning microscopy, comprising a multicolored light source for generating an illumination light beam, a separation apparatus for separating the illumination light beam into a plurality of illumination light partial beams, and an illumination beam path for guiding and focusing the illumination light partial beams into a respective luminous point on or in a sample. At least two of the illumination beam paths comprise controllable beam manipulation means for setting the spectral composition of the respective illumination light partial beam assigned to the illumination beam path. The device further comprises a scanning unit for guiding the luminous points over the sample, a detection unit for detecting detection light, and a control unit for controlling the scanning unit and the detection unit.

SUMMARY

In an embodiment, the present invention provides a method for scanning a sample in microscopy. The method includes generating at least three illumination spots in order to form a spot pattern that contains at least two illumination spots having a first wavelength and an illumination spot having a second wavelength that differs from the first wavelength. At least one specified region of the sample is scanned by moving the spot pattern formed by the illumination spots along a first direction for generating scan lines, which are each associated with the illumination spots of the spot pattern, and by moving the spot pattern formed by the illumination spots along a second direction for generating scan lines respectively after the scan lines.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
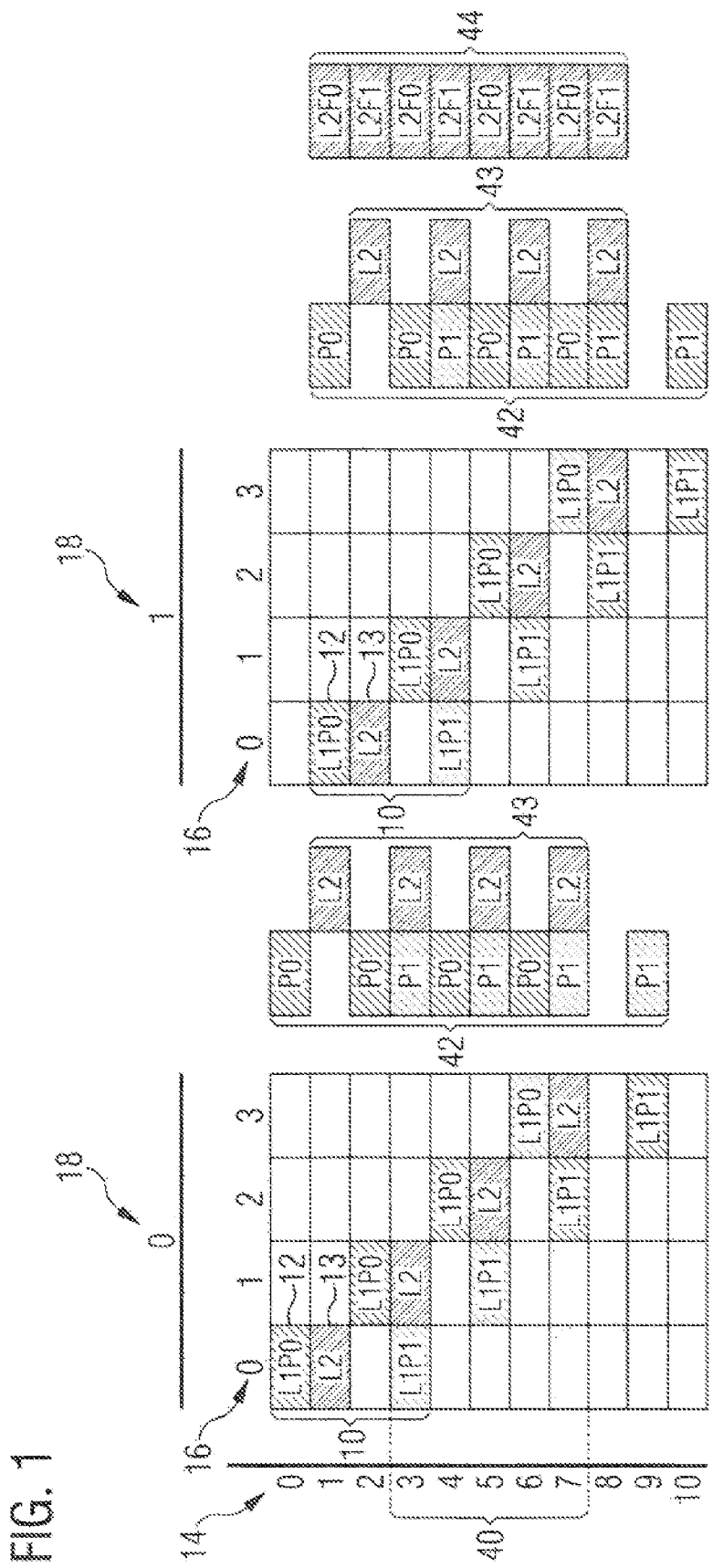
FIG. 1 shows a method for scanning a sample using two illumination spots having a first wavelength and one illumination spot having a second wavelength, in accordance with a first exemplary embodiment.

Embodiments of the present invention provide a method and a device which allow a sample to be scanned particularly efficiently using light of different wavelengths.

In the method according to an embodiment of the invention, at least three illumination spots are generated to form a spot pattern. For the purposes of scanning at least one specified region of the sample, the spot pattern formed by the illumination spots is moved along a first direction for generating scan lines, which are each associated with the illumination spots of the spot pattern, and along a second direction for generating scan lines respectively generated after the scan lines. The spot pattern contains at least two illumination spots having a first wavelength and a single illumination spot having a second wavelength that differs from the first wavelength.

In the present application, a scan line refers to a region of the sample substantially extending along the first direction, said region being scanned by the at least two illumination spots having the first wavelength and/or the illumination spot having the second wavelength. The specified region of the sample consequently comprises a plurality of successive scan lines along the second direction. It is frequently also referred to as "region of interest" (ROI).

As a result of the method according to an embodiment of the invention, the sample is scanned by the at least two illumination spots having the first wavelength. At the same time, the sample is scanned by the one illumination spot having the second wavelength. The use of illumination spots having different wavelengths allows, in particular, the excitation of two different fluorescence dyes, by means of which different portions of the sample have been marked. As a result of this, it is possible, for example, to observe the relative position in the movement of the various portions relative to one another. The scanning procedure is parallelized by using two illumination spots having the first wavelength, which increases the speed at which the sample is scanned by illumination spots having the first wavelength. As a result of the increased speed, it is possible, in particular, to observe dynamic processes in the sample, for example biological processes.

Consequently, the method according to an embodiment of the invention combines the advantages of methods for scanning a sample with a spot pattern made of a plurality of illumination spots—so-called multi-spot illumination—with the advantages of methods for scanning a sample utilizing a single illumination spot—a so-called single spot illumination. Further, only a single scanning unit is required to move the spot pattern as only a single spot pattern needs to be moved. Consequently, the method according to the invention can also be realized particularly easily.

Preferably, the first direction extends perpendicular to the second direction. This case is easy to implement and can be used for conventional sample geometries. Alternatively, any angle that differs from 90° can also be included by the first direction and the second direction.

It is advantageous if the specified region is scanned continuously or incrementally when moving the spot pattern along the first and/or second direction. As a result of continuous or incremental scanning, scan lines which serve as the basis for generating image lines in a subsequent detection method are scanned along the first direction.

It is particularly advantageous if the specified region is scanned completely in a single scan iteration by way of the illumination spots having the first wavelength when the spot pattern is moved along the second direction, and if the specified region is scanned completely in at least two scan iterations by way of the illumination spot having the second wavelength when the spot pattern is moved along the second direction. To this end, the spot pattern is offset by at least one scan line along the second direction between two successive scan iterations.

Preferably, the specified region is scanned completely in a number of scan iterations by way of the illumination spot having the second wavelength when moving the spot pattern along the second direction, the number of scan iterations corresponding to the number of illumination spots having the first wavelength, and the spot pattern is offset by at least one scan line after each scan iteration. As a result, it is possible, in particular, to undertake observations of dynamic processes in the sample with the aid of the first wavelength, while, as it were, a background in front of which the dynamic processes occur can be observed with the aid of the second wavelength.

Preferably, the spot pattern is moved along the second direction in such a way that it is moved by at least two scan lines along the second direction within one scan step. If the spot pattern is moved by at least two scan lines along the second direction within one scan step, at most every second scan line of the specified region is scanned by the illumination spot having the second wavelength.

Consequently, scan iteration within the present application is understood to mean the complete scan of the specified region with the aid of the illumination spots having the first wavelength. Here, a single scan iteration along the second direction can contain movements of the spot pattern both with and counter to the second direction, provided that the specified region is completely scanned (i.e., covered by scan steps) with the first wavelength by this procedure. By way of example, it is conceivable for the spot pattern to initially be moved with the second direction, with individual portions of the specified region being skipped (i.e., not being scanned), and for the spot pattern to subsequently be moved counter to the second direction in order to scan these portions skipped during the forward movement. A further example of a scan iteration is a movement of the spot pattern with the second direction, with portions being skipped, followed by a return jump, counter to the second direction, to the initial position (or any other suitable position) and scanning of the initially skipped portion. A scan step is understood to mean the movement of the spot pattern along the second direction for the purposes of generating a scan line, with the scan line generated thus following another scan line (except for the case of the first scan step of a scan iteration).

By way of example, during a first scan iteration, each scan line of the specified region can be scanned by the illumination spots having the first wavelength while only every second scan line of the specified region is scanned by the illumination spot having the second wavelength. In a second scan iteration following the first scan iteration, the scan lines of the specified region not scanned by the illumination spot having the second wavelength during the first scan iteration are scanned. Preferably, the spot pattern is displaced to this end by exactly one scan line with or counter to the second direction after a scan iteration. If the scan lines serve as a basis for the generation of image lines in a subsequent detection method, two images associated with the first wavelength are generated for each image associated with the second wavelength. Consequently, a high frame rate of images which are associated with the first wavelength is achieved. The frame rate of images associated with the second wavelength is reduced by a factor that corresponds to the number of illumination spots having the first wavelength.

It is advantageous if the illumination spots of the spot pattern are arranged on a line along the second direction. As a result, the method becomes particularly simple since the generation and use of two-dimensional spot patterns is relatively complex in comparison with the generation of one-dimensional spot patterns.

It is further advantageous if the illumination spots having the first wavelength are arranged equidistantly. The equidistant arrangement of the illumination spots having the first wavelength represents a particularly simple form of the spot pattern. Alternatively, the illumination spots having the first wavelength can also be arranged in groups, with the illumination spots having the first wavelength respectively assigned to a group being arranged equidistantly from one another with a first pitch while the groups have a second pitch from one another that differs from the first pitch (see FIG. 3 for an example).

It is particularly advantageous if a pitch defined in scan lines of the illumination spots having the first wavelength and/or a number of scan lines by which the spot pattern is moved along the second direction in one scan step depend/depends on the number of illumination spots having the first wavelength. Here, a pitch defined in scan lines of two illumination spots is understood to mean the number of scan lines by which one of the two illumination spots has to be moved along the second direction in order to reach the position of the other illumination spot. Two scan lines directly following one another consequently have a pitch of one scan line.

By way of example, the pitch defined in scan lines between the illumination spots having the first wavelength is equal to the number of illumination spots having the first wavelength plus one. If a spot pattern having this property is utilized, it is possible to scan all scan lines of the specified region by way of the illumination spots having the first wavelength during one scan iteration if the spot pattern is moved along the second direction in each scan step by a number of scan lines that corresponds to the number of illumination spots. Consequently, to scan the specified region with the illumination spot having the second wavelength, a number of scan iterations that corresponds to the number of illumination spots having the first wavelengths is required.

It is further advantageous if the illumination spots having the first wavelength and the illumination spot having the second wavelength are nonoverlapping illumination spots. Alternatively, the illumination spots having the first wavelength and the illumination spot having the second wavelength can overlap.

In another embodiment, the present invention provides a device for scanning a sample in microscopy, comprising an illumination unit which generates at least three illumination spots to form an illumination pattern. The device comprises a control unit for controlling the illumination unit, wherein the control unit controls the illumination unit in such a way that, for the purposes of scanning at least one specified region of the sample, the illumination unit moves the spot pattern formed by the illumination spots along a first direction for generating scan lines, which are each associated with the illumination spots of the spot pattern, and along a second direction for generating scan lines respectively generated after the scan lines. The spot pattern generated with the aid of the illumination unit contains at least two illumination spots having a first wavelength and a single illumination spot having a second wavelength that differs from the first wavelength. Preferably, the illumination unit comprises a scanning unit for moving the spot pattern along the first and/or second direction.

The device according to an embodiment of the invention scans the sample in parallel with the at least two illumination spots having the first wavelength and with the one illumination spot having the second wavelength. In particular, the illumination spots having different wavelengths allow two different fluorescence dyes to be excited to fluoresce, said dyes being used, for example, to mark two different portions of the sample. By providing two illumination spots having the first wavelength, the scanning procedure is parallelized, increasing the speed at which the sample is scanned with illumination spots having the first wavelength. As a result of the increased speed, it is possible, in particular, to observe dynamic processes within the sample, for example biological processes.

The device according to an embodiment of the invention consequently combines the advantages of devices for scanning a sample with a spot pattern made of a plurality of illumination spots with the advantages of devices for scanning a sample which use illumination spots with different wavelengths.

Preferably, the illumination spots having the first wavelength and the illumination spot having the second wavelength are nonoverlapping illumination spots. Alternatively, the illumination spots having the first wavelength and the illumination spot having the second wavelength can overlap.

It is advantageous if the unit for generating the spot pattern comprises at least one first wavelength-selective beam splitter. This represents a particularly simple option for producing even complex spot patterns. By way of example, the first wavelength-selective beam splitter can be transmissive to light having the first wavelength and can reflect light having the second wavelength.

It is furthermore advantageous if the first light source unit generates a light beam having the first wavelength and the illumination unit comprises a beam multiplication unit, wherein the beam multiplication unit generates the illumination spots having the first wavelength from the light beam having the first wavelength. Preferably, the beam multiplication unit comprises at least one acousto-optic deflector (AOD) or at least one beam splitter. The use of an AOD facilitates flexible setting of the pitches between the illumination spots. Even relatively complex spot patterns can be generated with the aid of beam splitters.

In a further embodiment, the present invention provides a microscope comprising an aforementioned device for scanning a sample. The microscope according to an embodiment of the invention facilitates, in particular, microscopic observation of dynamic processes in the sample, for example biological processes.

It is particularly advantageous if the microscope comprises a first detection unit, for example a spatially resolving area detector, which captures detection light having a third wavelength, which is associated with the first wavelength, emanating from the sample, and a second detection unit, for example a non-spatially resolved point detector, which captures detection light having a fourth wavelength, which is associated with the second wavelength, emanating from the sample. This allows at least two different portions of the sample, which are marked by two different fluorescence dyes, to be observed simultaneously by microscopy.

Further features and advantages of embodiments of the invention emerge from the following description, which explains the invention in more detail on the basis of exemplary embodiments and in conjunction with the attached figures.

FIGS. 1 to 5 show a method for scanning a sample on the basis of various exemplary embodiments. In the method, at least two illumination spots having a first wavelength L1, which are provided with reference sign 12 in general and numbered by L1P0, L1P1, etc., and an illumination spot 13 having a second wavelength L2 are generated to form a spot pattern. The spot pattern, provided with reference sign 10 in general below, is moved for the purposes of scanning at least one specified region 40 of the sample 102. Here, the spot pattern 10 is moved along a first direction to generate scan lines associated with the illumination spots 12, 13 of the spot pattern 10 and provided with reference sign 14 in general below, and along a second direction for generating scan lines 14 respectively generated after the scan lines 14.

When the spot pattern 10 is moved, the at least one specified region 40 is scanned continuously along the first direction and scanned incrementally along the second direction. Incremental scanning of the specified region 40 along the second direction is implemented in scan steps, which are provided with reference sign 16 in general. In FIGS. 1 to 3, the respective positions of the illumination spots 12, 13 along the second direction, i.e., from top to bottom in FIGS. 1 to 3, are shown in scan steps 16 that follow one another in time and are numbered starting with 0.

The sample is scanned during a plurality of scan iterations that follow one another in time, are provided with reference sign 18 in general, and are numbered starting with 0. A first scanning region 42 is respectively scanned by the illumination spots 12 having the first wavelength L1 during each scan iteration 18, said scanning region being illustrated to the right of the respective scan iteration 18 in FIGS. 1 to 3. A second scanning region 43 is respectively scanned by the illumination spot 13 having the second wavelength L2 during each scan iteration 18, said scanning region likewise being illustrated to the right of the respective scan iteration 18 in FIGS. 1 to 3.

FIG. 1 shows the method for scanning a sample using two illumination spots 12 having the first wavelength L1 and one illumination spot 13 having the second wavelength L2, in accordance with a first exemplary embodiment. The two illumination spots 12 having the first wavelength L1 are arranged with a pitch of three scan lines 14 along the second direction. The illumination spot 13 having the second wavelength L2 is arranged from the first illumination spot 12 (numbered L1P0) having the first wavelength L1 with a pitch of one scan line 14 in the second direction in such a way that the three illumination spots 12, 13 of the spot pattern 10 are arranged on a line along the second direction.

Incremental scanning of the specified region 40 along the second direction is implemented by virtue of the spot pattern 10 being moved by two scan lines 14 along the second direction in each scan step 16. The positions of the spot pattern 10 in scan steps 16 assigned to one another, i.e., in scan steps 16 with the same numbering, is offset by one scan line 14 in the direction of the second direction in the second scan iteration 18 (numbered by 1) in relation to the first scan iteration 18 (numbered by 0).

In each of the two scan iterations 18, the first scanning region 42, which completely comprises the specified region 40, is scanned by the illumination spots 12 having the first wavelength L1. The illumination spot 13 having the second wavelength L2 scans every second scan line 14 of the specified region 40 in each scan iteration 18. In two successive scan iterations 18, the illumination spot 13 having the second wavelength L2 scans a third scanning region 44, which completely comprises the specified region 40 and which is illustrated far right in FIG. 1. Consequently, the specified region 40 is completely scanned by the illumination spot 13 having the second wavelength L2 in two successive scan iterations 18.

Advantageously, results obtained by detection can be evaluated on an individual basis in each of the scan iterations 18. From these results, it is possible to generate images associated with the first and the second wavelength L1, L2. The image associated with the first wavelength L1 can be displayed after each scan iteration 18. The image associated with the second wavelength L2 can be displayed after every second scan iteration 18. Consequently, the image associated with the first wavelength L1 can be displayed with twice the frame rate of the display of the image associated with the second wavelength L2.

Figure 2A:
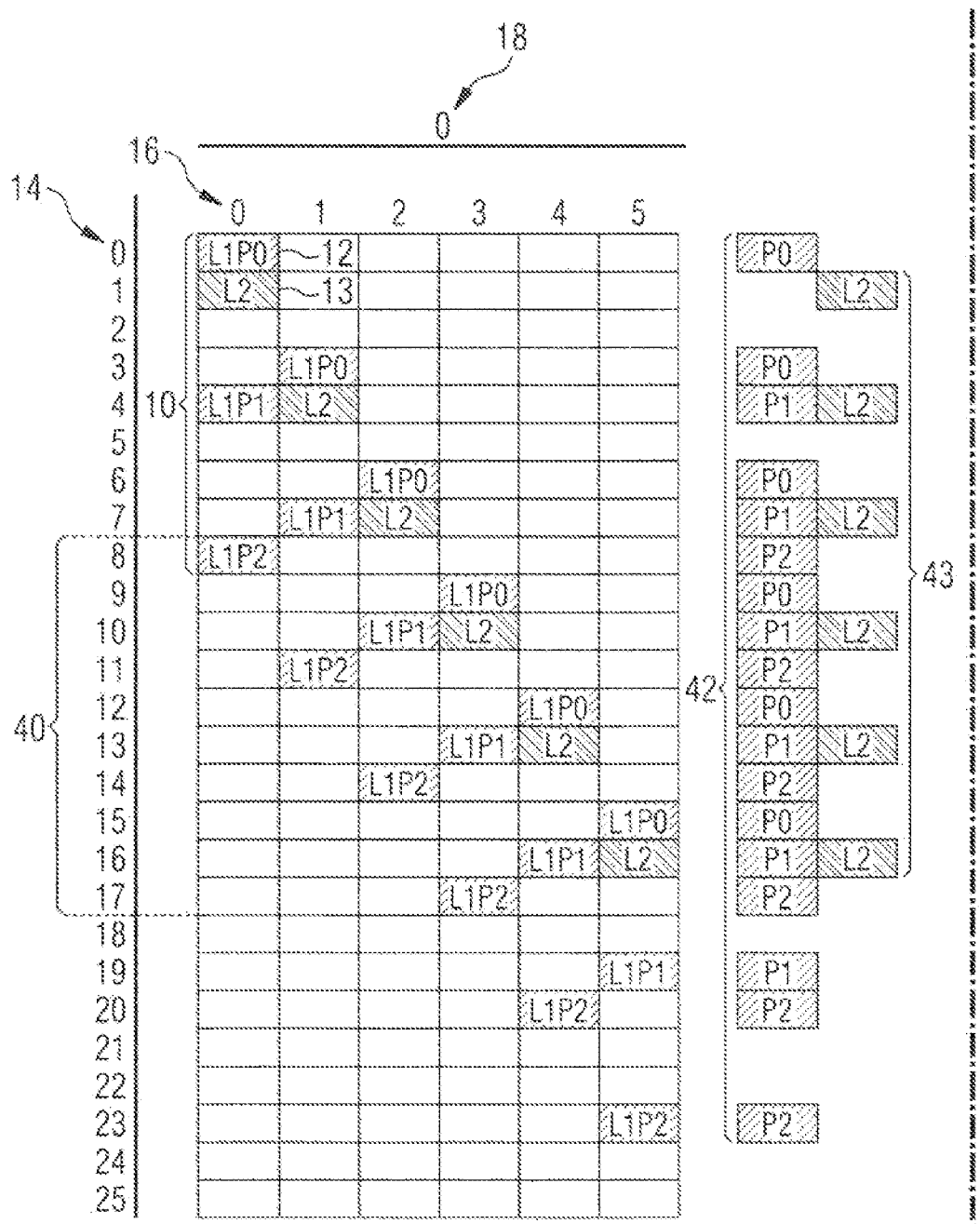
FIG. 2 includes sub-views FIGS. 2A-2C which show a method for scanning a sample using three illumination spots having the first wavelength and one illumination spot having the second wavelength, in accordance with a second exemplary embodiment.
Figure 2B:
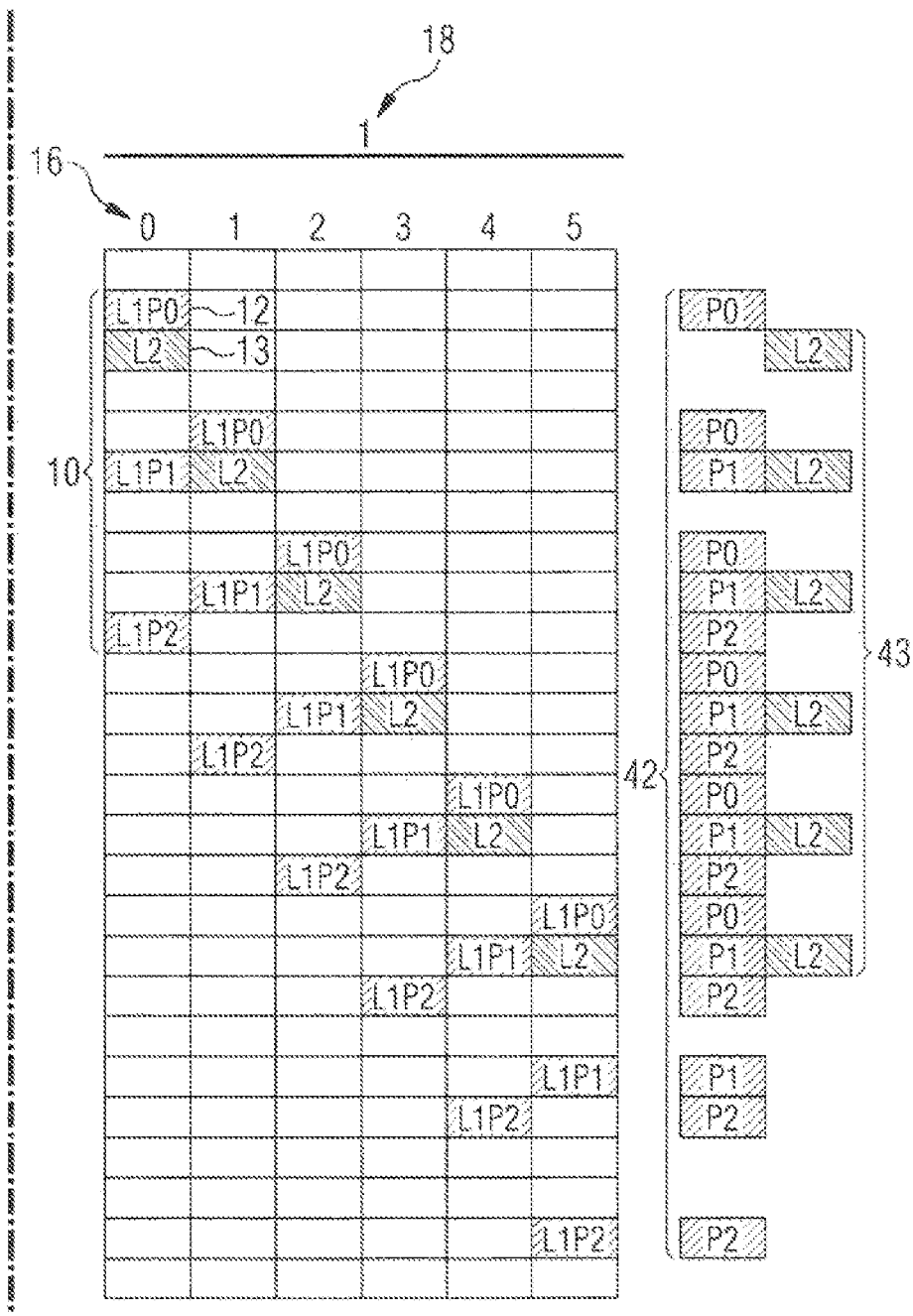
Figure 2C:
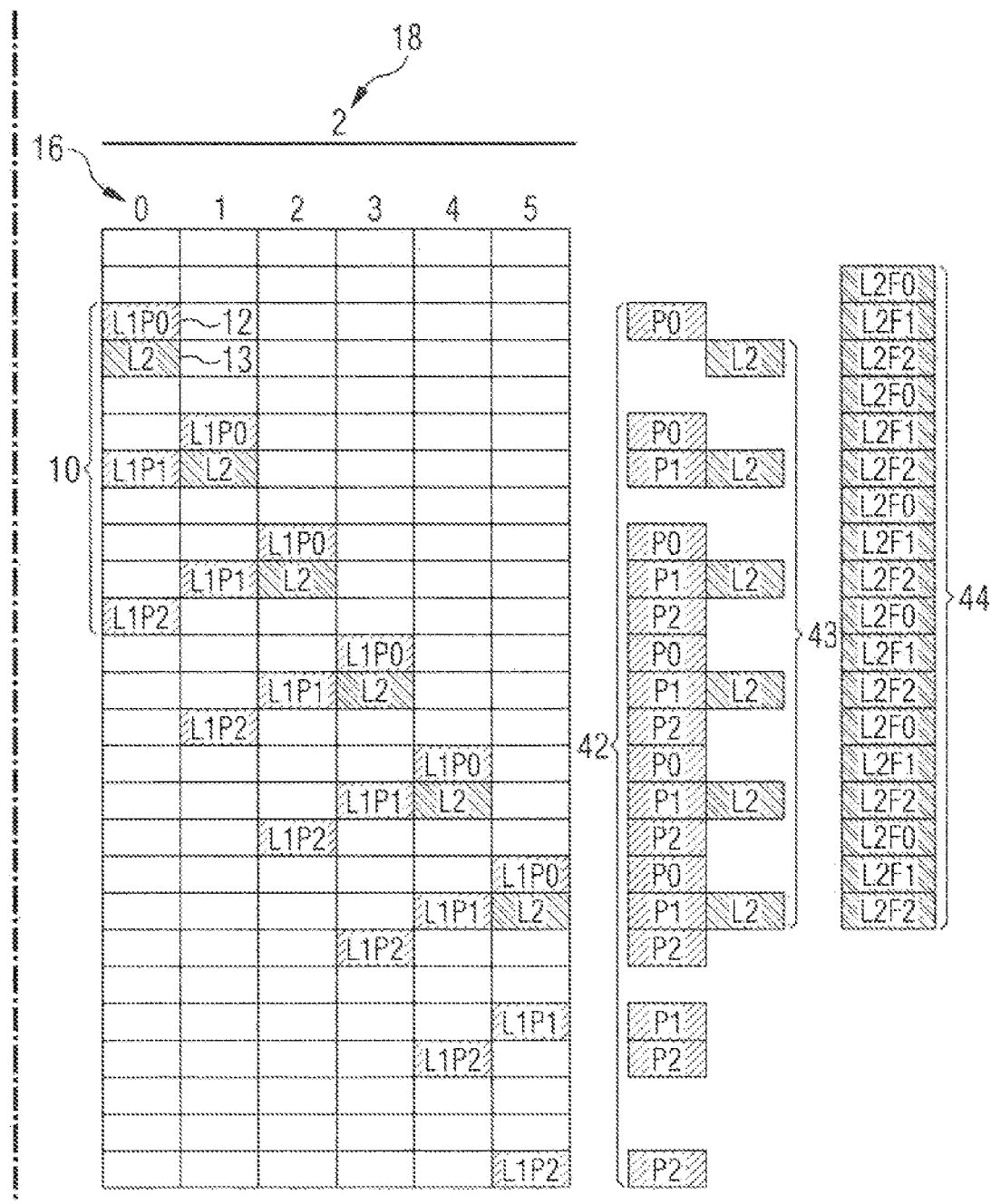

FIG. 2 shows the method for scanning the sample in accordance with a second exemplary embodiment. For a better overview, FIG. 2 is divided into three partial FIGS. 2A to 2C, which adjoin one another at the dash-dotted lines. The second exemplary embodiment shown in FIG. 2 substantially differs from the first exemplary embodiment shown in FIG. 1 by virtue of the sample 102 being scanned using three illumination spots 12 having the first wavelength L1 and one illumination spot 13 having the second wavelength L2. A total of four illumination spots 12, 13 of the spot pattern 10 are arranged on a line along the second direction. The three illumination spots 12 having the first wavelength L1 are arranged with a pitch of four scan lines 14 along the second direction. The illumination spot 13 having the second wavelength L2 is arranged from the first illumination spot 12 (numbered L1P0) having the first wavelength L1 with a pitch of one scan line 14 in the second direction.

In the second exemplary embodiment shown, the incremental scanning of the specified region 40 along the second direction is implemented by virtue of the spot pattern 10 being moved by three scan lines 14 along the second direction in each scan step 16. The positions of the spot pattern 10 in scan steps 16 assigned to one another, i.e., in scan steps 16 with the same numbering, are offset by respectively one scan line 14 in the direction of the second direction in directly subsequent scan iterations 18.

In the second exemplary embodiment shown in FIG. 2, the illumination spot 13 having the second wavelength L2 scans every third scan line 14 of the specified region 40 during each scan iteration 18. Consequently, the third scanning region 44, which completely comprises the specified region 40 and which is illustrated far right in FIG. 2C, is scanned by the illumination spot 13 having the second wavelength L2 in three successive scan iterations 18. Consequently, the specified region 40 is completely scanned by the illumination spot 13 having the second wavelength L2 in three successive scan iterations 18 in the second exemplary embodiment shown in FIG. 2.

The image associated with the second wavelength L2 can be displayed after every third scan iteration 18 in the second exemplary embodiment shown. Consequently, the image associated with the first wavelength L1 can be displayed with three-times the frame rate of the display of the image associated with the second wavelength L2.

Figure 3B:
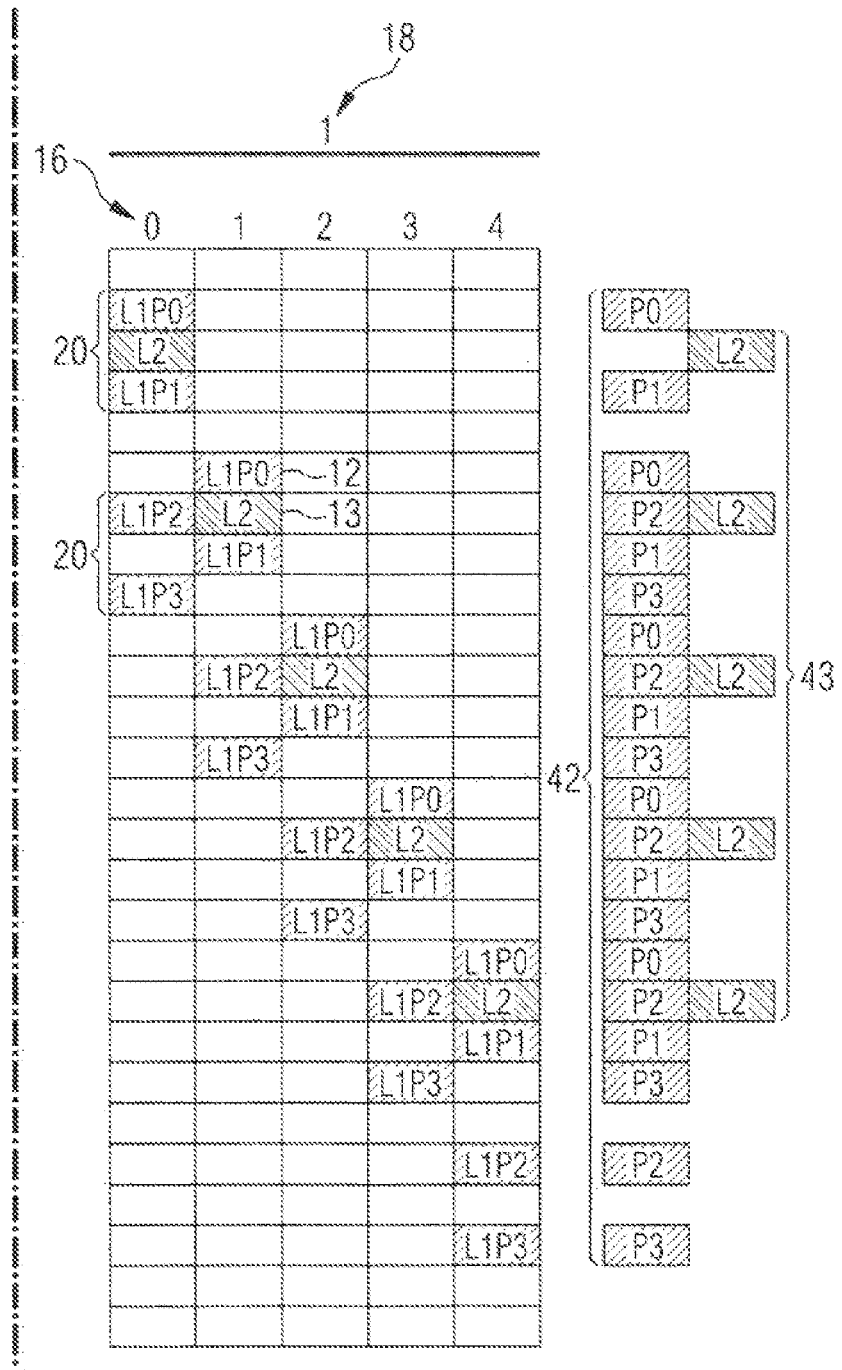
FIG. 3 includes sub-views FIGS. 3A-3D which show a method for scanning a sample using four illumination spots having the first wavelength and one illumination spot having the second wavelength, in accordance with a third exemplary embodiment.
Figure 3C:
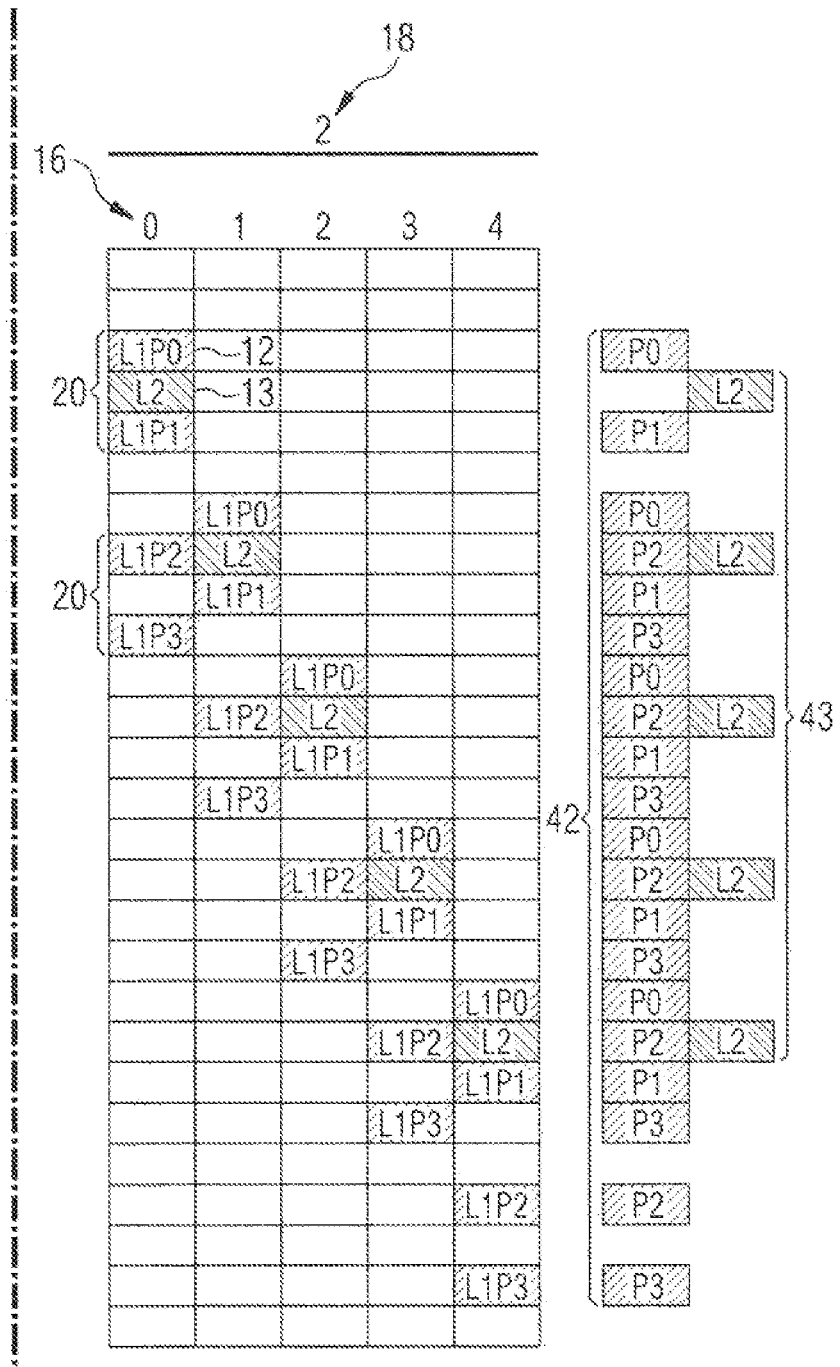
Figure 3D:
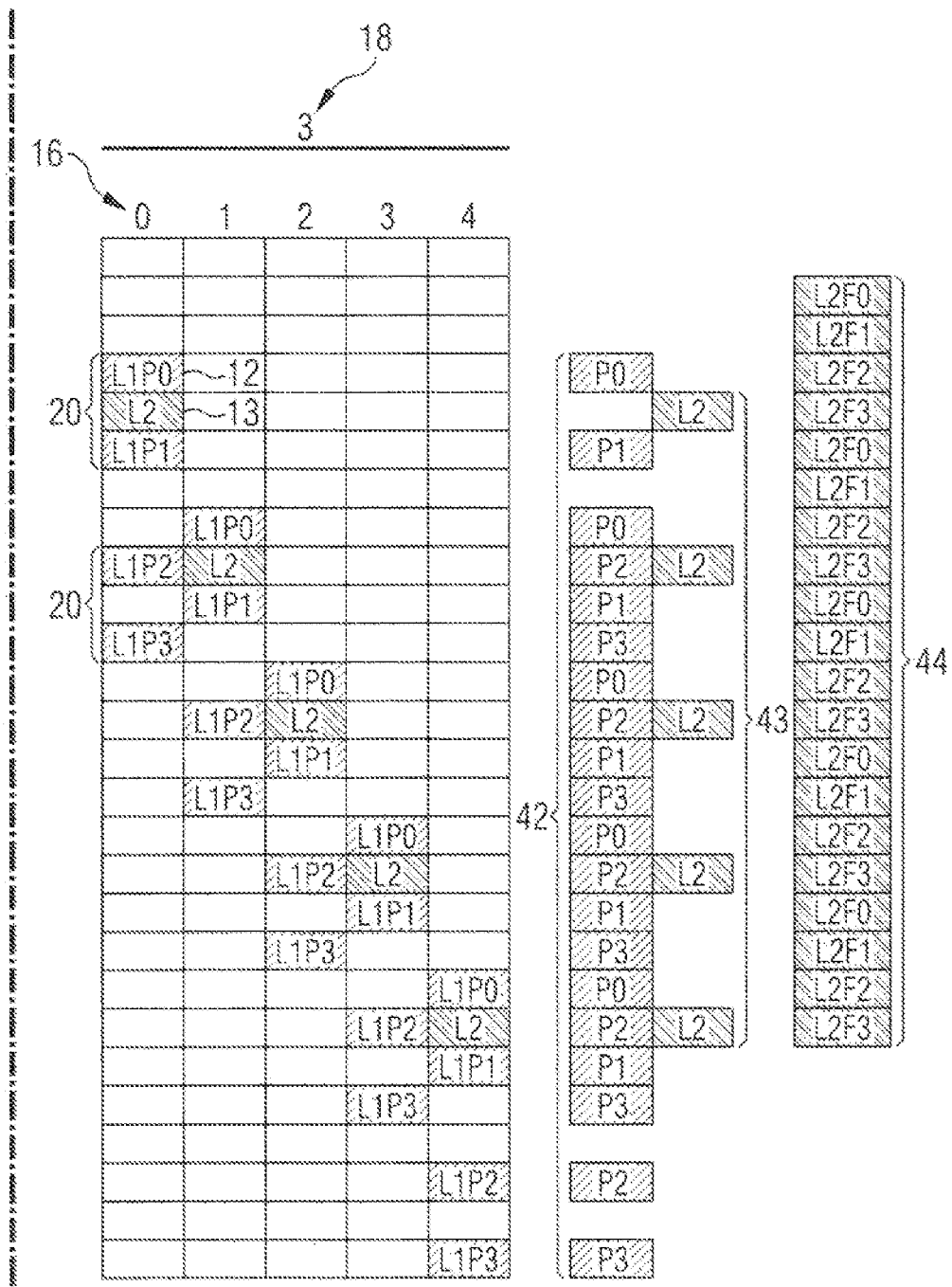

FIG. 3 shows the method for scanning the sample in accordance with a third exemplary embodiment. For a better overview, FIG. 3 is divided into four partial FIGS. 3A to 3D, which adjoin one another at the dash-dotted lines. The third exemplary embodiment shown in FIG. 3 substantially differs from the first exemplary embodiment shown in FIG. 1 by virtue of the sample 102 being scanned using four illumination spots 12 having the first wavelength L1 and one illumination spot 13 having the second wavelength L2. The total of five illumination spots 12, 13 of the spot pattern 10 are arranged on a line along the second direction. The four illumination spots 12 having the first wavelength L1 are split into two groups 20, each with two illumination spots 12 having the first wavelength L1. The two illumination spots 12 having the first wavelength L1 of each of the two groups 20 are arranged with a pitch of two scan lines 14 along the second direction. The two groups 20 have a pitch of three scan lines 14 from one another. The illumination spot 13 having the second wavelength L2 is arranged from the first illumination spot 12 (numbered L1P0) having the first wavelength L1 with a pitch of one scan line 14 in the second direction.

The illumination spot 13 having the second wavelength L2 scans every fourth scan line 14 of the specified region 40 during each scan iteration 18. Consequently, a third scanning region 44, which completely comprises the specified region 40 and which is illustrated far right in FIG. 3D, is scanned by the illumination spot 13 having the second wavelength L2 in four successive scan iterations 18. Consequently, the specified region 40 is completely scanned by the illumination spot 13 having the second wavelength L2 in four successive scan iterations 18 in the third exemplary embodiment shown in FIG. 3.

In the third exemplary embodiment, the image associated with the second wavelength L2 can be displayed after every fourth scan iteration 18. Consequently, the image associated with the first wavelength L1 can be displayed with four-times the frame rate of the display of the image associated with the second wavelength L2.

Figure 4A:
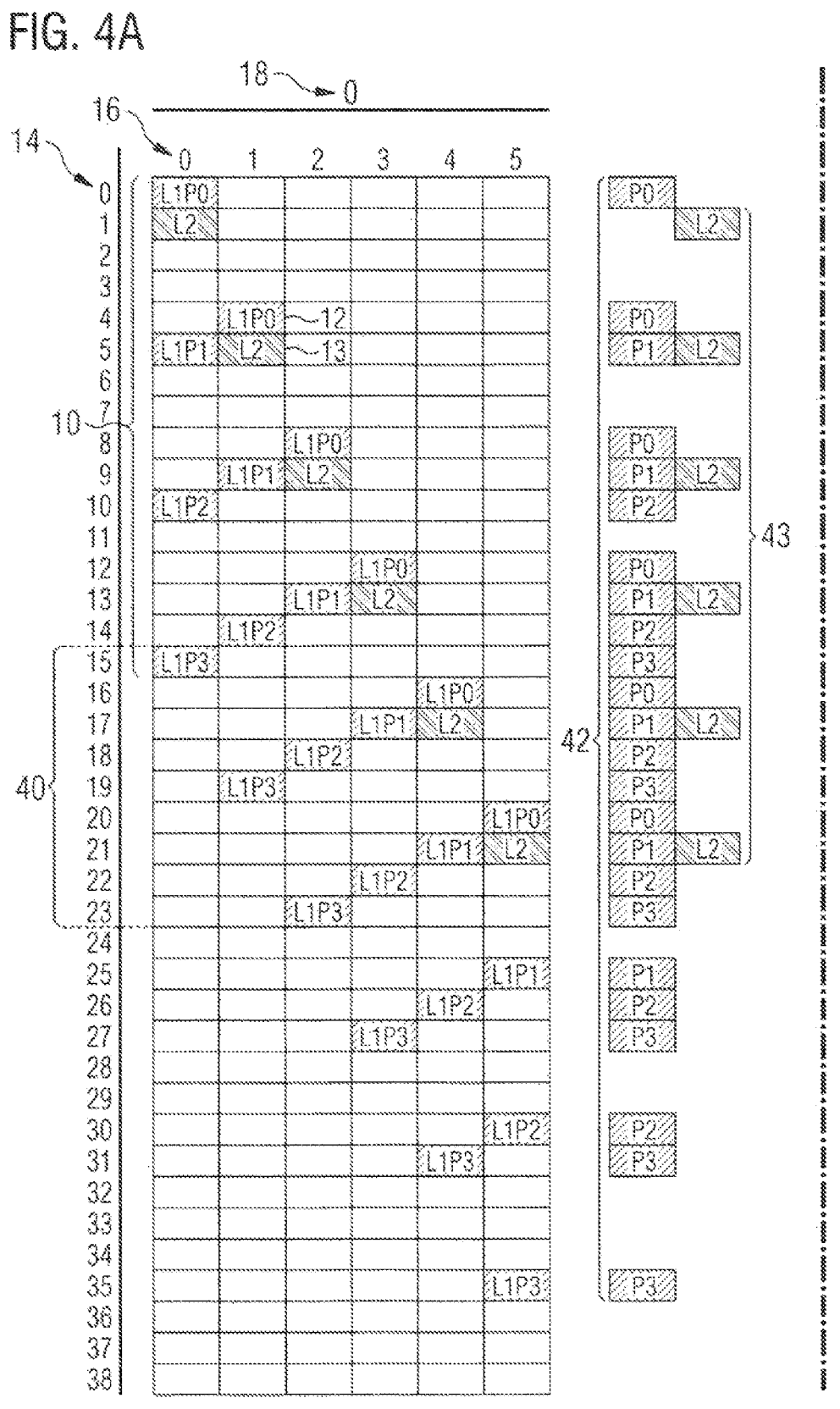
Figure 4B:
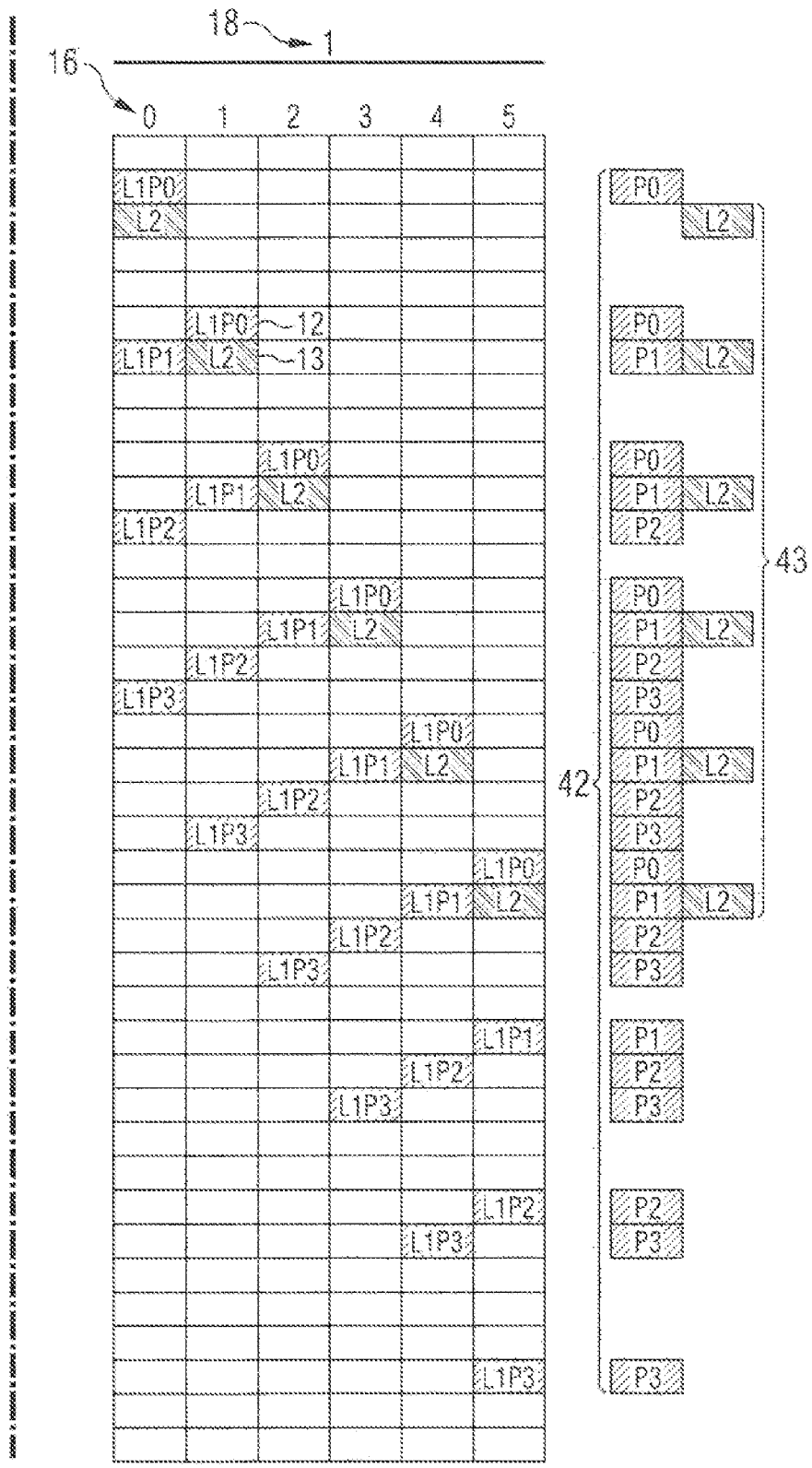
FIG. 4 includes sub-views FIGS. 4A-4D which show a method for scanning the sample in accordance with a fourth exemplary embodiment.
Figure 4C:
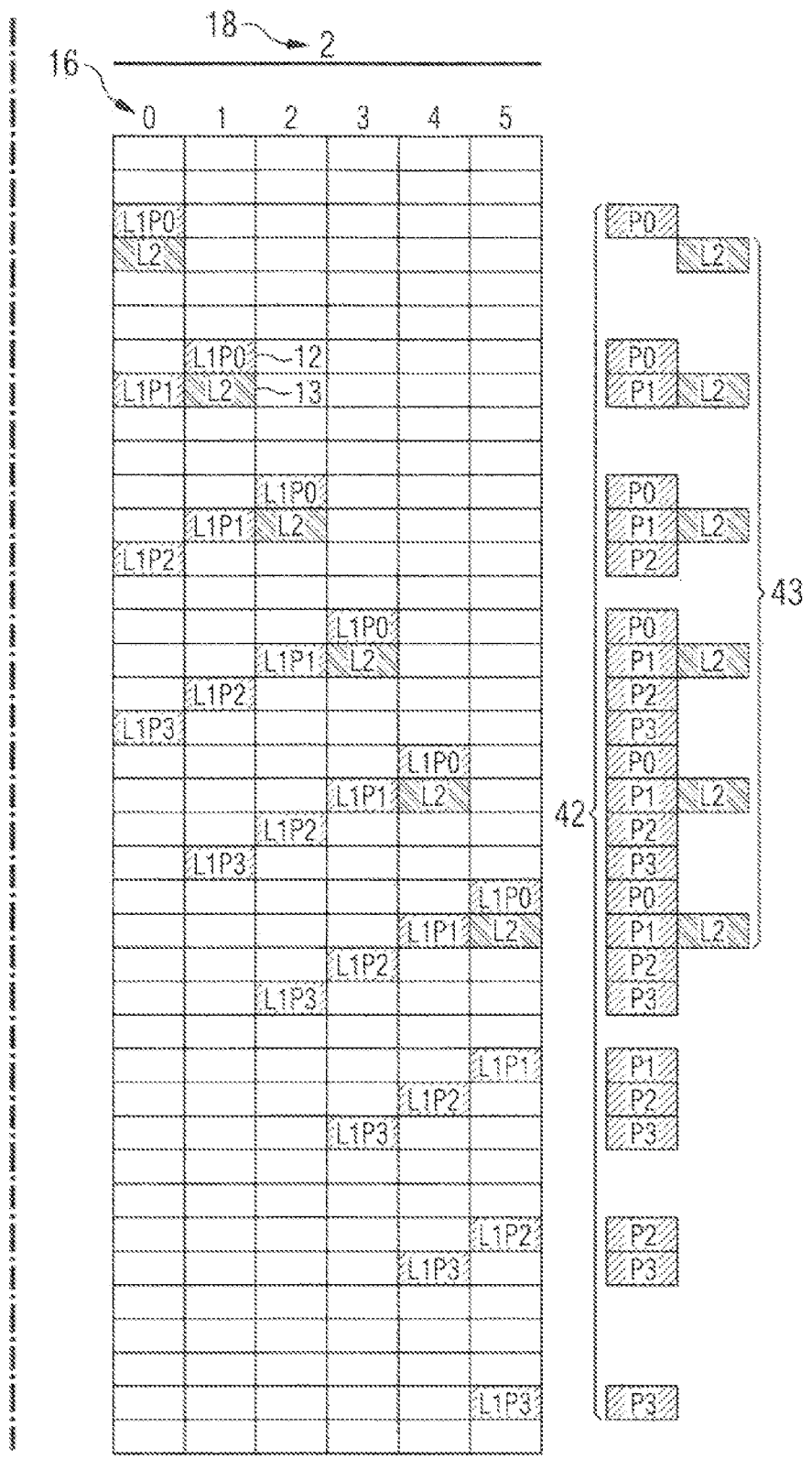

FIG. 4 shows the method for scanning the sample in accordance with the fourth exemplary embodiment. For a better overview, FIG. 4 is divided to four partial FIGS. 4A to 4D, which adjoin one another at the dash-dotted lines. The fourth exemplary embodiment shown in FIG. 4 substantially differs from the third exemplary embodiment shown in FIG. 3 by virtue of the four illumination spots 12 being arranged equidistantly along the second direction with a respective pitch of five scan lines 14.

Consequently, the specified region 40 is completely scanned by the illumination spot 13 having the second wavelength L2 in four successive scan iterations 18 in the fourth exemplary embodiment shown in FIG. 4, just like in the third exemplary embodiment shown in FIG. 3.

Figure 5A:
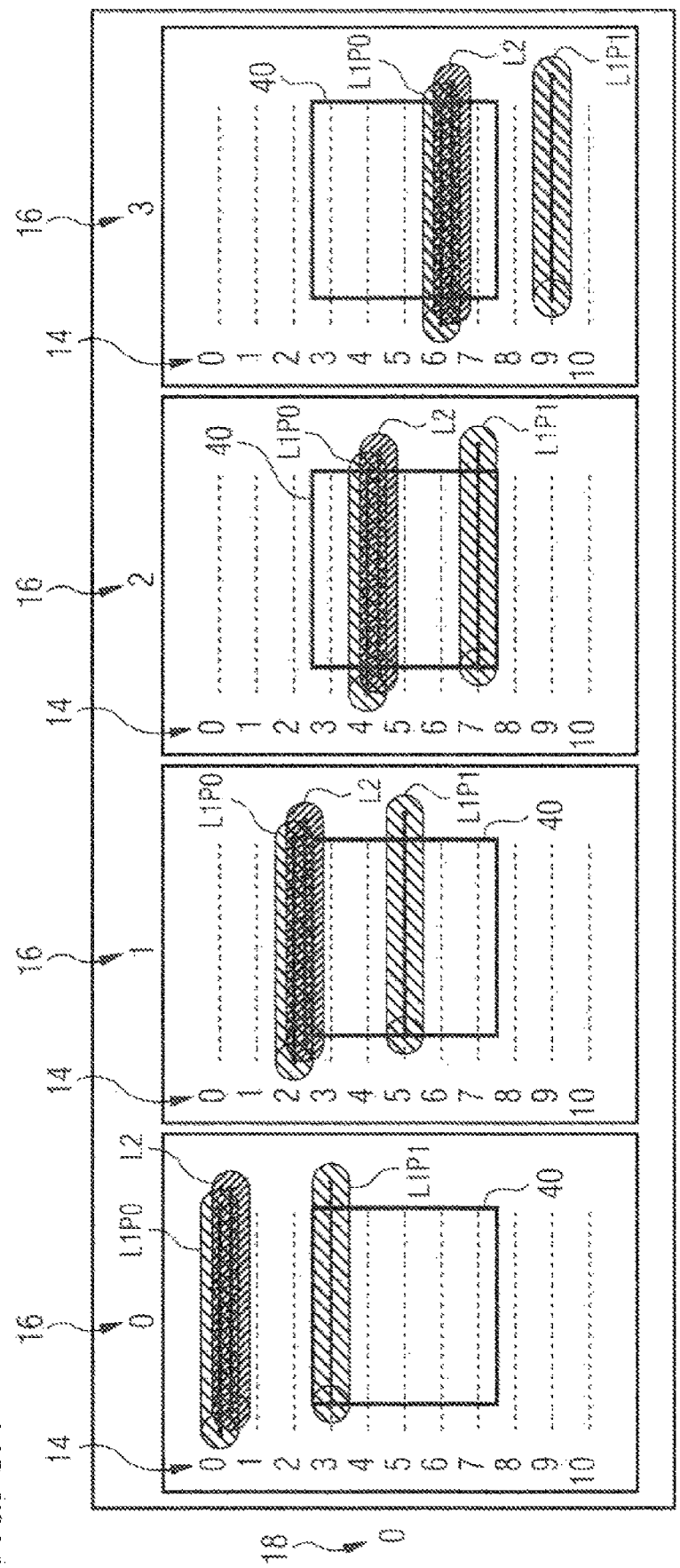
FIG. 5 includes sub-views FIGS. 5A-5B which show a method for scanning the sample in accordance with a fifth exemplary embodiment.

FIG. 5 shows the method for scanning the sample in accordance with the fifth exemplary embodiment. The fifth exemplary embodiment shown in FIG. 5 substantially differs from the first exemplary embodiment shown in FIG. 1 by virtue of the first illumination spot having the first wavelength L1, denoted by L1P0, and the second illumination spot having the first wavelength L1, denoted by L1P1, not being located on a line along the second direction. Further, the first illumination spot having the first wavelength L1 and the illumination spot, denoted L2, having the second wavelength L2 are partly overlapping.

Figure 6:
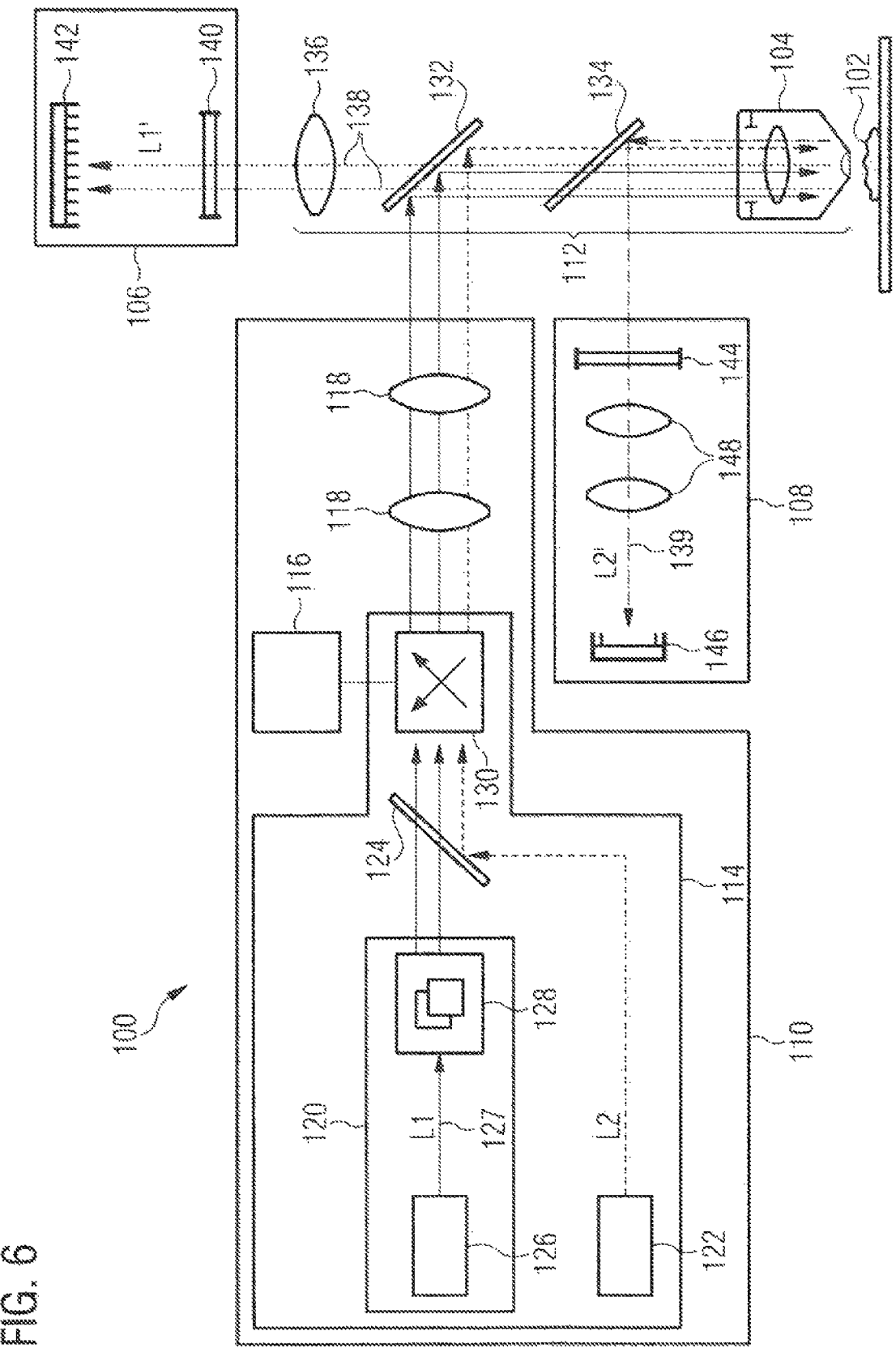
FIG. 6 shows a schematic illustration of a microscope comprising a device for scanning a sample in accordance with one exemplary embodiment

FIG. 6 shows a schematic illustration of a microscope 100 comprising a device 110 for scanning a sample 102 in accordance with one exemplary embodiment. The microscope 100 further comprises an objective optical unit 104, a first detection unit 106, a second detection unit 108, and an observation beam path 112. The microscope 100 according to FIG. 6 is particularly suitable for carrying out the method according to the invention in accordance with any of the exemplary embodiments according to FIGS. 1 to 5.

The device 110 for scanning the sample 102 comprises an illumination unit 114 for generating a spot pattern 10, a control unit 116 for controlling the illumination unit 114, and further optical elements such as, e.g., lenses, stops, filters or prisms, which are denoted in general by reference sign 118.

The illumination unit 114 comprises a first light source unit 120 for generating illumination spots 12 having a first wavelength L1 and a second light source unit 122 for generating an illumination spot 13 having a second wavelength L2. The illumination unit 114 furthermore comprises a first wavelength-selective beam splitter 124 for generating the spot pattern 10. The first light source unit 120 comprises a first light source 126, which generates a light beam 127 having the first wavelength L1, and a beam multiplication unit 128, for example a beam splitter or an acousto-optic deflector (AOD), which generates the illumination spots 12 having the first wavelength L1 from the light beam 127 having the first wavelength L1. The illumination unit 114 further comprises a scanning unit 130 (e.g., comprising one or more scanning mirrors) for moving the spot pattern 10 along a first and a second direction. In the exemplary embodiment shown, the scanning unit 130 is arranged outside of the observation beam path 112. Alternatively, the scanning unit 130 can be arranged within the observation beam path 112, as a result of which the scanning movement is canceled again during the return of detection light 138, 139, which emanates from the sample 102. Commonly, this is also referred to as a "descanned" arrangement.

The control unit 116 controls the scanning unit 130 of the illumination unit 114 in such a way that, for the purposes of scanning at least one specified region 40 of the sample 102, the scanning unit 130 moves the spot pattern 10 along the first direction for generating scan lines 14, which are respectively associated with the illumination spots 12, 13 of the spot pattern 10, and along the second direction for generating scan lines 14 respectively generated after the scan lines 14.

The observation beam path 112 is situated between the sample 102 and the first detection unit 106. The objective optical unit 104, a second wavelength-selective beam splitter 132, a third wavelength-selective beam splitter 134, and further optical elements, such as, e.g., lenses, stops, filters or prisms, which are denoted in general by the reference sign 136, are arranged in the observation beam path 112.

The second wavelength-selective beam splitter 132 reflects light having the first wavelength L1 and light having the second wavelength L2 and transmits light having a third wavelength L1', which is associated with the first wavelength L1. By way of the second wavelength-selective beam splitter 132, the spot pattern 10 generated by the illumination unit 114 is coupled into the observation beam path 112, which thus also serves as illumination beam path, and reflected in the direction of the objective optical unit 104.

The objective optical unit 104 images the spot pattern 10 onto or into the sample 102. There, the spot pattern 10 excites dyes to emit detection light 138 having the third wavelength L1' and detection light 139 having the fourth wavelength L2'. The detection light 138 having the third wavelength L1' emanating from the sample 102 and the detection light 139 having the fourth wavelength L2' emanating from the sample 102 are guided by the objective optical unit 104 to the observation beam path 112.

The third wavelength-selective beam splitter 134 reflects light having the fourth wavelength L2' and transmits light having the first wavelength L1, light having the second wavelength L2, and light having the third wavelength L1'. By way of the third wavelength-selective beam splitter 134, the detection light 139 having the fourth wavelength L2' emanating from the sample 102 is coupled out of the observation beam path 112 and steered to the second detection unit 108.

The first detection unit 106 comprises a first emission filter 140, which only transmits light having the third wavelength L1', and a first sensor element 142, which is embodied as a CCD chip, for example. Detection light 138 having the third wavelength L1' emanating from the sample 102 is captured by the first sensor element 142. In particular, the detection light 138 having the third wavelength L1' captured by the first sensor element 142 can serve as a basis for generating an image associated with the first wavelength L1. Alternatively, the first sensor element 142 can also comprise a plurality of point detectors, with each illumination spot 12 having the first wavelength L1 being associated with a dedicated point detector.

The second detection unit 108 comprises a second emission filter 144, which only transmits light having the fourth wavelength L2', a second sensor element 146, embodied as a 1-channel detector in exemplary fashion, and further optical elements such as, e.g., lenses, stops, filters or prisms, which are denoted in general by reference sign 148. The detection light 139 having the fourth wavelength L2' emanating from the sample 102 is captured by the second sensor element 146. The detection light 139 having the fourth wavelength L2' captured by the second sensor element 146 can serve, in particular, as a basis for generating an image associated with the second wavelength L2.

In an alternative configuration of the microscope 100, both the detection light 138 having the third wavelength L1' and the detection light 139 having the fourth wavelength L2' are captured by the first sensor element 142. The microscope 100 in accordance with the alternative configuration therefore requires no second detection unit 108 and no wavelength-selective beam splitter 134. In this alternative configuration, the second wavelength-selective beam splitter 132 also transmits light having a fourth wavelength L2' which is associated with the second wavelength L2. Instead of the first emission filter 140, the microscope 100 in accordance with the alternative configuration comprises an image separation system ("image splitting device") for splitting light incident in the first detection unit 106 according to third wavelength L1' and fourth wavelength L2'.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Spot pattern
12, 13 Illumination spot
14 Scan line
16 Scan step
18 Scan iteration
20 Group
100 Microscope
102 Sample
104 Objective optical unit
106, 108 Detection unit
110 Device
112 Observation beam path
114 Illumination unit
116 Control unit
118, 136, 148 Optical element
120, 122 Light source unit
124, 132, 134 Wavelength-selective beam splitter
126 Light source
127 Light beam
128 Beam multiplication unit
130 Scanning unit
138, 139 Detection light
140, 144 Emission filter
142, 146 Sensor element

The invention claimed is:

1. A method for scanning a sample in microscopy, the method comprising:
generating at least three illumination spots in order to form a spot pattern that contains at least two illumination spots having a first wavelength and an illumination spot having a second wavelength that differs from the first wavelength; and
scanning at least one specified region of the sample by moving the spot pattern formed by the illumination spots along a first direction for generating scan lines, which are each associated with the illumination spots of the spot pattern, and by moving the spot pattern formed by the illumination spots along a second direction for generating further scan lines respectively after the scan lines, wherein a pitch defined in the scan lines of the illumination spots having the first wavelength is equal to a number of illumination spots having the first wavelength plus one.

2. The method as claimed in claim 1, wherein the specified region is scanned continuously or incrementally when moving the spot pattern along the first and/or second direction.

3. The method as claimed in claim 1, wherein the specified region is scanned completely in a single scan iteration by way of the illumination spots having the first wavelength when the spot pattern is moved along the second direction, or wherein the specified region is scanned completely in at least two scan iterations by way of the illumination spot having the second wavelength when the spot pattern is moved along the second direction.

4. The method as claimed in claim 3, wherein the specified region is scanned completely in a number of scan iterations by way of the illumination spots having the second wavelength when moving the spot pattern along the second direction, the number of scan iterations corresponding to a number of the illumination spots having the second wavelength, and wherein the spot pattern is offset by at least one scan line after each scan iteration.

5. The method as claimed in claim 1, wherein the spot pattern is moved along the second direction in such a way that the spot pattern is moved by at least two scan lines along the second direction within one scan step.

6. The method as claimed in claim 1, wherein the illumination spots of the spot pattern are arranged on a line along the second direction.

7. The method as claimed in claim 1, wherein the illumination spots having the first wavelength are arranged equidistantly.

8. The method as claimed in claim 1, wherein a number of the further scan lines by which the spot pattern is moved along the second direction in one scan step depends on the number of illumination spots having the first wavelength.

9. The method as claimed in claim 1, wherein the illumination spots having the first wavelength and the illumination spot having the second wavelength are nonoverlapping illumination spots.

10. The device as claimed in claim 9, wherein the illumination spots having the first wavelength and the illumination spot having the second wavelength are nonoverlapping illumination spots.

11. A device for scanning a sample in microscopy, the device comprising:
an illuminator configured to generate at least three illumination spots to form a spot pattern that contains at least two illumination spots having a first wavelength and an illumination spot having a second wavelength that differs from the first wavelength; and
a controller configured to control the illuminator such that, for scanning at least one specified region of the sample, the illuminator moves the spot pattern formed by the illumination spots along a first direction for generating scan lines, which are each associated with the illumination spots of the spot pattern, and moves the spot pattern formed by the illumination spots along a second direction for generating further scan lines respectively after the scan lines, wherein a pitch defined in the scan lines of the illumination spots having the first wavelength is equal to a number of illumination spots having the first wavelength plus one.

12. The device as claimed in claim 11, wherein the illuminator comprises a first light source configured to generate the illumination spots having the first wavelength and a second light source configured to generate the illumination spot having the second wavelength, or wherein the illuminator comprises a unit configured to generate the spot pattern, wherein the unit for generating the spot pattern uses beam merging for generating the illumination spots having the first wavelength and the illumination spot having the second wavelength.

13. The device as claimed in claim 12, wherein the unit configured to generate the spot pattern comprises at least one first wavelength-selective beam splitter.

14. The device as claimed in claim 12, wherein the first light source generates a light beam having the first wavelength, and wherein the illuminator comprises a beam multiplier that generates the illumination spots having the first wavelength from the light beam having the first wavelength.

15. The device as claimed in claim 14, wherein the beam multiplier comprises at least one acousto-optic deflector or at least one beam splitter.

16. The device as claimed in claim 11, wherein the illuminator comprises a scanner configured to move the spot pattern along the first and/or second direction.

17. A microscope comprising the device as claimed in claim 11.

18. The microscope as claimed in claim 17, further comprising a first detector configured to capture detection light having a third wavelength, which is associated with the first wavelength, emanating from the sample, and a second detector configured to capture detection light having a fourth wavelength, which is associated with the second wavelength, emanating from the sample.

* * * * *